United States Patent Office 3,761,380
Patented Sept. 25, 1973

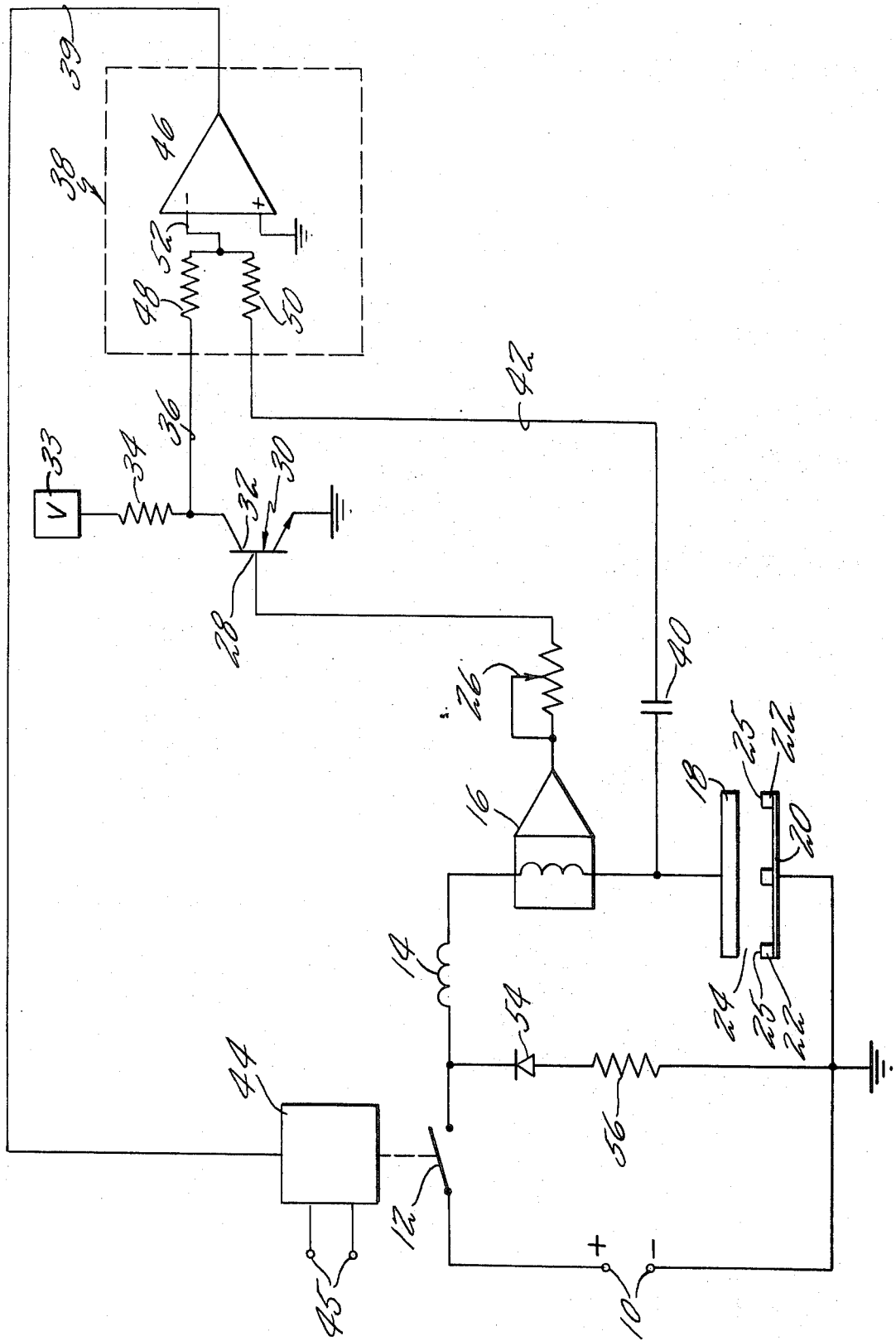

3,761,380
ADAPTIVE SPARK DETECTION SYSTEM FOR AN ELECTROCHEMICAL MACHINING APPARATUS
Norman D. Ballard, East Hartford, Conn., assignor to United Aircraft Corporation, East Hartford, Conn.
Filed Nov. 24, 1971, Ser. No. 201,884
Int. Cl. B01k 3/00
U.S. Cl. 204—228                     3 Claims

ABSTRACT OF THE DISCLOSURE

Apparatus for terminating an electrochemical machining process is concurrently responsive to the electrolyzing current and changes of voltage in the gap between one or more electrodes and the workpiece, the invention thereby automatically adapting itself to a plurality of electrochemical processes.

BACKGROUND OF THE INVENTION

Field of invention.—This invention relates to electrochemical machining apparatus, and more particularly to circuitry for detecting an electrical disturbance typically caused by a spark.

Description of the prior art.—In the operation of electrochemical machining apparatus, the machining process is basically one of electrolysis wherein a DC voltage is applied between one or more electrodes and a workpiece, the workpiece being connected to the positive terminal of a DC voltage source and the electrodes being connected to the negative terminal. A conductive solution or electrolyte, which may comprise an aqueous solution of a soluble metallic salt, is introduced between the electrodes and the workpiece usually by pumping it through holes in the electrodes. During the electrolysis, the material on the workpiece opposite each electrode goes into the solution and is flushed away. As this electrochemical erosion takes place, the position of electrodes or the workpiece is adjusted so that the gap between the electrodes and the workpiece remains constant. In the absence of a spark, substantially all of the DC voltage is across the gap.

A primary limitation on the speed of the machining process is the voltage that may be sustained across the gap; too high a voltage will cause a spark. Sparking may also be caused by poor distribution in the flow of electrolyte, an insufficient injection pressure of the electrolyte, and the presence of impurities in the electrolyte. Persistance of a spark can damage a cathode thereby requiring its replacement, or damage the workpiece by pitting or by causing stresses that could contribute to its fatigue failure.

One of the characteristics indigenous to the event of a spark is a rapid drop in the voltage across the gap, and most known spark detection systems for electrochemical machining apparatus are responsive specifically to this phenomenon. Additionally, in most known spark detection systems there is an inductor in series with the gap to prevent a current surge that could accompany a spark.

The disadvantage of prior art spark detection systems is that when a spark occurs, the voltage change between an electrode terminal and the workpiece depends upon the current in the gap and the resistance of the electrodes because each electrode has a nonzero resistance. In an application where a single electrode is used, a spark causes the voltage across the gap to drop but the inductor in series with the gap tends to keep the current in the gap constant; hence, the voltage dropped across the single electrode (electrode voltage drop) remains unchanged and a change of voltage, equal to the voltage across the gap prior to the occurrence of a spark, is sensed by the spark detection system. However, in an application where 100 electrodes are used and the current in the gap is 50 amperes (½ ampere per electrode), a spark between a single electrode and the workpiece causes all the 50 amperes to flow through the single electrode. The nonzero resistance of an electrode that sustains the spark may cause an increased electrode voltage drop, causing a corresponding decrease in the voltage change that is sensed by the spark detection system and causing nonresponse of the system to the occurrence of a spark.

Therefore, existing spark detection systems are not suitable for use with an electrochemical machining apparatus that use a plurality of electrodes.

SUMMARY OF THE INVENTION

An object of the present invention is to provide an electrochemical machining apparatus spark detection system.

A further object of the present invention is to provide an improved spark detection system for use with electrochemical machining apparatus that may be used for a plurality of processes that require different numbers of electrodes and electrolyzing current.

According to the present invention, a signal representative of changes in a DC voltage between a workpiece and a connection area of one or more electrodes are compared with a trigger signal inversely proportional to the current flowing across a gap formed by working areas of said electrodes and said workpiece; a process termination signal is provided in response to a decrease greater than said trigger signal.

In an exemplary embodiment of the present invention, a process termination means disconnects the DC voltage in response to said process termination signal.

The present invention provides a spark detection system which, after a single adjustment, is adaptive and may be used to protect the workpiece and electrodes from damage in a wide range of electrochemical machining processes.

Other objects, features and advantages of the present invention will become more apparent in the light of the following detailed description of a preferred embodiment thereof as illustrated in the accompanying drawing.

BRIEF DESCRIPTION OF THE DRAWING

The sole figure herein is a schematic block diagram of a preferred embodiment of the invention.

DESCRIPTION OF THE PREFERRED EMBODIMENT

In the present invention, a change signal representative of changes of an electrolyzing voltage is compared to an adaptive trigger signal which is inversely proportional to an electrolyzing current. A rapid decrease of the electrolyzing voltage by an amount in excess of the adaptive trigger signal may be used to terminate the electrochemical machining process.

As explained hereinbefore, in a multi-electrode machining process, a spark causes substantially all of the electrolyzing current to flow through a single electrode that sustains the spark, thereby causing a substantial electrode voltage drop which diminishes the decrease of the electrolyzing voltage (incident to the spark) between a connection area of the electrodes and a workpiece. In the preferred embodiment an increase of the sensitivity of a process termination means in proportion to the electrolyzing current compensates for the electrode voltage drop.

Referring now to the drawing, a DC voltage is provided to terminals 10 for application to a series combination of a pair of process termination contacts 12, and inductor 14, and electrolyzing current sensor 16, a workpiece 18 and connection areas 20 of one or more electrodes 22. In the absence of a spark, the contacts 12 are closed and substantially all of the voltage is dropped across a gap 24 between working areas 25 of the electrodes 22 and the workpiece 18.

A sensor output voltage proportional to the electrolyzing current is provided by the sensor 16 and applied to a potentiometer 26 in series with the base 28 of a transistor 30. The sensor output voltage controls the base current, and therefore the collector current of the transistor 30, in proportion to the electrolyzing current. The collector 32 of the transistor 30 is connected to a source 33 of transistor operating voltage, V, via a resistor 34, and is connected through a signal line 36 to a differential comparator 38, which draws a negligible current; substantially all of the collector current flows through the resistor 34. As explained hereinafter, an inversion means which includes the potentiometer 26, the transistor 30 and the resistor 34 provides a voltage on the collector 32 which is inversely proportional to the sensor voltage (or electrolyzing current). The voltage on the collector 32 is the adaptive trigger signal herein (referred to as a trigger voltage hereinafter).

An electrochemical machining process that utilizes a low electrolyzing current causes a correspondingly low collector current; therefore, there is only a small voltage dropped across the resistor 34 thereby providing a trigger voltage close to a maximum value (the transistor operating voltage, V). A process that utilizes a high electrolyzing current causes a correspondingly high collector current; therefore, there is a large voltage dropped across the resistor 34 thereby providing a trigger voltage close to a minimum value (ground potential). Hence, there is an inverse relationship of the trigger voltage on the collector 32 to the electrolyzing current, therefore the trigger voltage is adaptive.

Changes of the electrolyzing voltage (change signal) are coupled through a coupling means, such as a capacitor 40, and through a signal line 42 to an input of the differential comparator 38 which compares the changes with the trigger voltage. The comparator 38 provides a positive voltage on a signal line 39 to a unipolar latching relay 44 in response to a decrease of the electrolyzing voltage which is in excess of the trigger voltage. The relay 44 responds to the positive voltage by causing the contacts 12, associated therewith, to latch in the "open" state and thereby terminates the electrochemical machining process. At all times that decreases of the electrolyzing voltage are less than the trigger voltage, the comparator 38 provides a negative voltage to which the relay 44 is non-responsive (because the relay 44 is unipolar). The contacts 12 may be returned to the "closed" state in response to a restart voltage which is first applied and then removed from terminals 45 of the relay 44. Hence, the comparator 38 in combination with the relay 44 are the process termination means, the sensitivity thereof being proportional to the electrolyzing current (inversely proportional to the trigger voltage).

The comparator 38 is of a type that is well known in the art that comprises an operational amplifier 46, and equal summing resistors 48, 50. The output signal line 39 provides a positive voltage to the relay 44 only when the voltage on the line 42 is of a negative polarity (associated with a decrease in the electrolyzing voltage) and larger in magnitude than the positive trigger voltage on the line 36, thereby causing a net negative input to the inverting input 52; this is a response typical of an operational amplifier.

The usual difference between different electrochemical processes is the electrolyzing current. An initial adjustment of the operation voltage, V, and the potentiometer 26, as described hereinafter, provides a desired trigger voltage with a desired dependence upon the electrolyzing current.

The operating voltage, V, is typically adjusted to a level approximately equal to the electrolyzing voltage. The potentiometer 26 is typically adjusted so that a large electrolyzing current (associated with a process using a large plurality of electrodes) causes a decrease of the trigger level commensurate with an expected electrode voltage drop when a spark occurs. Since the trigger level is inversely related to the electrolyzing current as described hereinbefore, the invention may be used for different processes requiring different numbers of electrodes.

In this embodiment, the sensor 16 provides a low impedance path for an electrolyzing current being sensed; it may be of the type disclosed in U.S. Pat. No. 3,389,320 or any other suitable sensor known in the art.

A diode 54 and a resistor 56 comprise a well known circuit for preventing a high voltage transient due to interruption of the current in the inductor 14 by opening of the contacts 12; the diode 54 and the resistor 56 provide a path for the current in the inductor 14, thereby dissipating the energy which has been stored during the electrochemical machining process.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for use in connection with an electrochemical machining process where an electrolyzing current is caused to flow across a gap formed between a workpiece and a working area of at least one electrode having working and connection areas in response to an electrolyzing voltage imposed between the connection area and the workpiece, comprising:

means connected in series with said gap for preventing a current surge across the gap;

circuit means responsive to the electrolyzing current for providing an adaptive trigger signal having a value which is inversely proportional to the electrolyzing current, the value of said adaptive trigger signal being related to the expected decrease of the electrolyzing voltage incident to a spark in said gap;

coupling means connected to receive the electrolyzing voltage for providing a change signal substantially representative of changes thereof; and comparison means connected to said circuit means and said coupling means for comparing the value of said adaptive trigger signal to the value of said change signal and providing a process termination signal in response to a decrease of the electrolyzing voltage commensurate with the expected decrease incident to a spark in said gap;

2. Apparatus according to claim 1 wherein said circuit means comprises:

current sensing means responsive to the electrolyzing current for providing a sensor signal proportional to the electrolyzing current; and inversion means responsive to said sensor signal for providing said adaptive trigger signal.

3. Apparatus according to claim 1, additionally comprising means connected for response to said process termination signal for disconnecting the electrolyzing voltage.

References Cited

UNITED STATES PATENTS

| | | | |
|---|---|---|---|
| 3,679,566 | 7/1972 | Fulkerson | 204—228 |
| 3,652,440 | 3/1972 | Dehner | 204—228 |
| 3,650,940 | 3/1972 | Bardahl | 204—228 X |
| 3,664,945 | 5/1972 | Junker et al. | 204—228 |
| 3,627,667 | 12/1971 | Plofsky | 204—228 X |

JOHN H. MACK, Primary Examiner

D. R. VALENTINE, Assistant Examiner